T. OFFICER AND H. H. MERCER.
STONEWORKING MACHINE.
APPLICATION FILED MAR. 24, 1916.

1,310,248.

Patented July 15, 1919.
2 SHEETS—SHEET 1.

Inventor
Henry H. Mercer
Thomas Officer
By
Atty.

T. OFFICER AND H. H. MERCER.
STONEWORKING MACHINE.
APPLICATION FILED MAR. 24, 1916.
1,310,248.
Patented July 15, 1919.
2 SHEETS—SHEET 2.
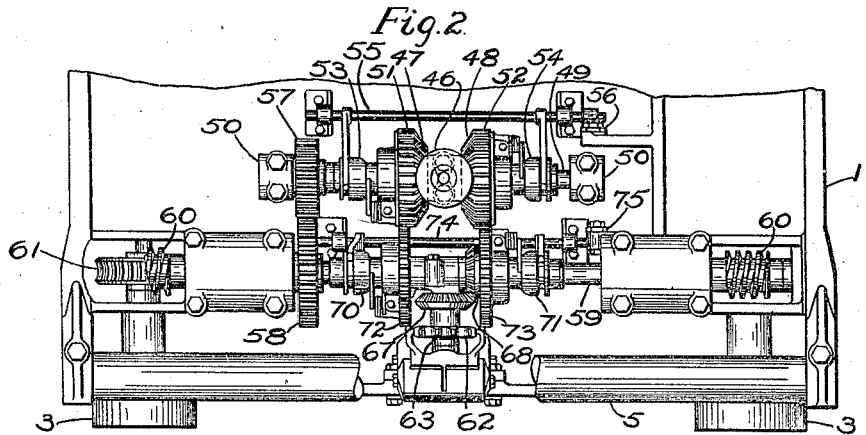
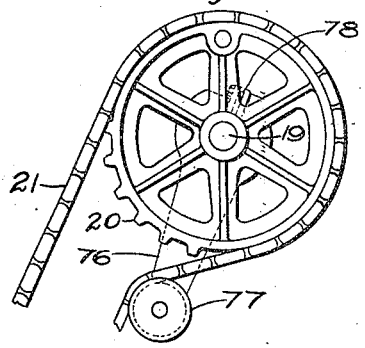
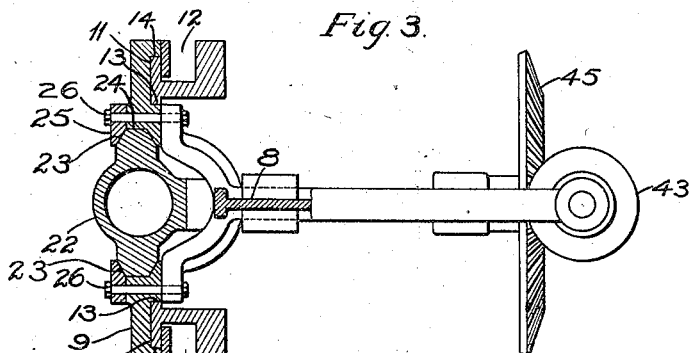
Inventor
Henry H Mercer
Thomas Officer
By
Atty.

UNITED STATES PATENT OFFICE.

THOMAS OFFICER AND HENRY H. MERCER, OF CLAREMONT, NEW HAMPSHIRE, ASSIGNORS TO SULLIVAN MACHINERY COMPANY, OF CLAREMONT, NEW HAMPSHIRE, A CORPORATION OF MASSACHUSETTS.

STONEWORKING-MACHINE.

1,310,248.  Specification of Letters Patent.  Patented July 15, 1919.

Original application filed January 2, 1908, Serial No. 408,165. Divided in part and this application filed March 24, 1916. Serial No. 86,508.

*To all whom it may concern:*

Be it known that we, THOMAS OFFICER and HENRY H. MERCER, citizens of the United States, residing at Claremont, in the county of Sullivan and State of New Hampshire, have invented certain new and useful Improvements in Stoneworking-Machines, of which the following is a full, clear, and exact specification.
Our invention relates to stone working machines, and more particularly to machines adapted to cut a channel in stone, although the same is not limited to use in that connection.
It has among its objects to provide improved operating and controlling mechanism for a stone working tool whereby the weight of the parts and the consequent strains and whipping of the tool is materially reduced, at the same time that the expense of manufacturing the machine is also reduced, and a device produced which performs its function efficiently and is possessed of great flexibility. A further object of our invention is to provide improved power connections between a motor carried on the truck and the tool actuating mechanism whereby the latter may be adjusted into any desired position relative to the work or the truck without disturbing those power connections, and whereby, if desired, the latter may be driven from the same motor which drives the truck and adjusts the tool actuating mechanism on the standard.
In the accompanying drawings, we have for purposes of illustration shown our invention as applied to an electric channeler of the type described and claimed in our Patent No. 1,206,358, patented Nov. 28, 1916, of which this application is a continuation in part.

In these drawings:—

Fig. 2 is a plan view of the driving mechanism therefor, the motor being removed to facilitate illustration.
Fig. 3 is a partial sectional view taken on line 3—3 of Fig. 1.

Fig. 4 is a detail view of a portion of the power connections to the frame feeding mechanism.

Figure 1:
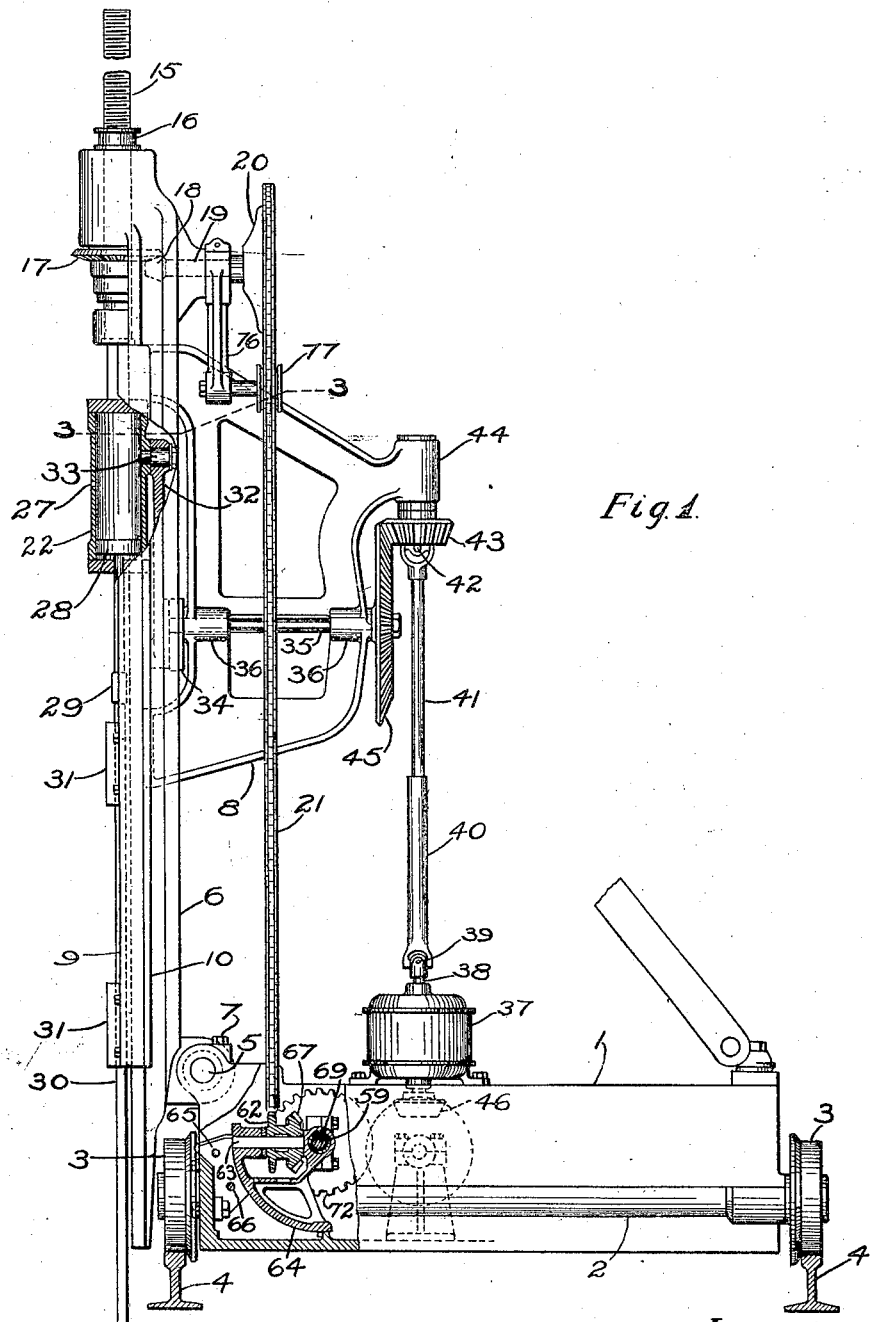
Figure 1 is an end elevation of a channeler equipped with this form of our improvement, the cylinder and portions of the frame being broken away to facilitate illustration.

In the construction shown, a channeler truck 1 is provided with axles 2 carrying wheels 3, the truck being movable along a track 4 in the usual manner. Carried upon this truck 1 is a longitudinally disposed trunnion bar 5, and upon this bar 5 is carried a standard 6 adjustable longitudinally of the bar to either end of the same and also adjustable angularly about the bar through means of a releasable clamping connection 7. Upon this standard 6 is slidably mounted a rearwardly extending frame 8 carrying at the top and bottom of its front end suitable laterally disposed guide plates 9 and gibs 10 so that the frame may be slid longitudinally of suitable ways 11 formed on opposite sides of the standard, the gibs 10 preferably extending in rear of the ways 11 and moving in vertically disposed grooves 12 formed in the standard, and the inner and outer surfaces of the ways 11 preferably also engaging shoulders 13 and 14 on the members 9. As shown, the upper end of this sliding frame 8 is connected to the lower end of a threaded adjusting screw 15 in a well known manner, the screw extending up and through a suitable nut 16 carried on the upper end of the standard 6 and being rotatable to adjust the frame 8 and control the operation of the cutting mechanism through suitable beveled gearing 17, 18, the gear 18 being carried on a short transverse shaft 19 journaled on the standard, and in turn carrying a sprocket 20 on its free end which is connected through a chain 21 to suitable driving mechanism hereinafter described.

Reciprocatively mounted between the plates 9 and movable relative to the frame 8 in a suitable cut-away portion of the latter, is a tool actuating cylinder 22, this cylinder being provided with laterally extending beveled guides 23 at its sides receivable in longitudinally disposed, beveled grooved portions 24 formed on the members 9, and retained in position thereon by suitable gibs 25, the latter, as well as the members 9, preferably being bolted to the frame 8 by the same bolts 26. As illustrated, this cylinder 22 is preferably provided with an air inlet 27 at a point between its ends and has reciprocably mounted therein and movable back and forth across this inlet, a piston 28 carrying at its lower end a hammer 29 adapted to engage intermittently with a channeler tool or steel 30 reciprocatively mounted on the frame 8 in suitable guides 31, and having its lower end extending into the cut and normally in engagement with the bottom thereof. This cylinder 22 is reciprocated in such a manner as to operate the piston 28 and hammer 29, through a connecting rod or pitman 32 connected at one end to a pin 33 on the cylinder, and having its opposite end journaled on a crank disk 34, which is in turn fixed to one end of a horizontally disposed shaft 35 journaled in suitable bearings 36 on the frame 8 and driven by any suitable motor or equivalent engine such, for instance, as the electric motor 37. As shown, this motor has its armature shaft 38 vertically disposed and connected through a universal joint 39 with a telescopic shaft comprising outer and inner sections 40, 41, of which the latter section is also preferably connected through a universal joint 42 with a small beveled gear 43, journaled in a suitable bearing 44 on the frame 8, and meshing with a larger beveled gear 45 fixed to the rear end of the shaft 35.

In our improved construction, the motor 37 also acts as a driving means for the truck 1, the motor for that purpose being provided on the opposite end of its armature shaft with a beveled gear 46 meshing constantly with oppositely rotatable beveled gears 47 and 48, loosely mounted on a counter shaft 49 which is journaled in suitable bearings 50 on the bottom of the truck and extends longitudinally thereof. As shown, these beveled gears 47 and 48 are preferably formed integral with larger gears 51 and 52, and the connection of these gears 51 and 52 to the shaft 49 is preferably controlled by suitable clutch members 53, 54, of well known construction, in such a manner that when one or the other of these clutch members is operated to reciprocate the same along the shaft 49, as by movement in opposite directions of a clutch controlling rod 55 operated by a handle 56, one or the other of these gears is clutched to the shaft 49 so that, since the gears 51, 52, are obviously driven in different directions by the gear 46, the rotation of the motor 37 in one direction may be transmitted to the shaft 49 in either direction. Fixed to this shaft 49 is also preferably a gear 57 meshing with a gear 58 fixed to a truck-driving shaft 59 suitably journaled on the bottom of the truck 1 parallel to the shaft 49, and preferably provided with worms 60 on its opposite ends engageable with worm gears 61 carried on the axles 2. Obviously, through such a construction, by a simple manipulation of the controlling handle 56, the rotation of the motor 37 may be converted into a rotation in either direction of the shaft 59, in such a manner as to propel the truck 1 in the desired direction along the track 4.

In our improved construction, the feed screw 15 for adjusting the frame upon the standard 6 to control the operation of the steels on the work is preferably also driven from the same motor 37, the latter being adapted to operate the chain 21 hereinbefore mentioned. As shown, the lower end of this chain passes around a sprocket 62 journaled on a suitable stud 63 which is in turn carried on a swinging quadrant 64 of well known construction, movable about the shaft 59 as a pivot, and held in any desired position by the usual clamping members 65, 66. A beveled gear 67 is preferably adapted to rotate with this sprocket 62. This beveled gear constantly meshes with a coöperating beveled gear 68 loosely mounted on the truck-driving shaft 59, and connectible through a usual clutch sleeve 69 and clutch members 70 and 71 of well known construction, with one or the other of rotating gears 72, 73, meshing with the gears 51, 52 hereinbefore described, the clutch members being controlled in a well known manner by suitable mechanism including a clutch controlling rod 74 operated by a suitable handle 75. Obviously through this construction, when the handle 75 is suitably operated, the rotation of the armature shaft 38 may be conveyed in either direction to the sprocket 62 in such a manner as to cause the frame to be adjusted on the standard 6 as desired. In this connection, attention should also be directed to the fact that we have provided a suitable swinging member or bracket 76 upon the upper end of the standard 6, which carries an idler roller 77 engageable with one of the runs of the chain 21 in such a manner as to maintain this chain at the desired tension, the bracket member 76 being adjustably attached to the standard 6 by any suitable adjustable clamping means, such, for instance, as a nut and bolt connection 78, in order to enable the tension to be varied as desired.

In the operation of our improved construction, the rotation of the armature shaft 38 will obviously result in a reciprocation of the cylinder 22, and the reciprocation of the latter will result in a reciprocation of the piston 28, the latter being reciprocated up and down in the cylinder in such a manner as to bring its hammer 29 in contact with the upper end of the tool or steel 30 with rapidly recurring blows, the action of the piston being of course cushioned in such a manner as to produce an elastic blow, by the cushioning effect of the air entering the cylinder through the inlet 27 as the piston moves up and down. As hereinabove described, it will of course also be obvious that the rotation of this armature shaft 38 may also result in the movement in either direction of the truck 1 along the track 4, the direction of movement of the truck being under the control of the controlling handle 56; and that the frame 8 may also be shifted longitudinally of the standard 6 by the same motor upon suitable manipulation of the controlling handle 75. Attention should also be directed to the fact that through the provision of the flexible extensible shaft provided between the motor 37 and the cylinder-reciprocating or driving means, the standard 6 may be adjusted as desired about its trunnion 5, and the frame 8 may be adjusted as desired along the standard 6, without in any way interfering with the driving mechanism. It should also be noted that by our improved construction, not only does the single motor 37 drive all of the operative mechanism of the channeler, but that it is made unnecessary to mount a heavy motor upon the adjustable frame 8 carried on the standard 6, the weight instead being carried upon the truck and relatively close to the ground in such a manner as to provide a very stable base without danger of rocking or racking of the frame and whipping of the tool such as is often experienced when the motor is mounted high upon the standard. These and other advantages of our improved construction will, however, be apparent to those skilled in the art.

While we have in this application specifically described one embodiment which our invention may assume in practice, it is of course to be understood that the form of our invention shown is used for purposes of illustration, and that the invention itself may be modified and embodied in other forms without departing from its spirit, it being our intention to include all such modifications within the scope of the appended claims.

What we claim as new and desire to secure by Letters Patent is:

1. In a stone working machine, a truck, an angularly adjustable standard thereon bodily movable longitudinally thereof, tool actuating mechanism including a plurality of reciprocable members on said standard, a motor on said truck, and a constantly operative driving connection between said tool actuating mechanism and said motor.

2. In a stone working machine, a truck, a laterally adjustable standard thereon bodily movable longitudinally thereof, tool actuating mechanism including a plurality of reciprocable members on said standard, a motor on said truck, and a flexible driving connection between said tool actuating mechanism and said motor.

3. In a stone working machine, a truck, a standard thereon adjustable laterally relative thereto and bodily movable longitudinally thereof, tool actuating mechanism on said standard including a plurality of relatively reciprocable members, a motor on said truck, and a constantly operative driving connection between said tool actuating mechanism and said motor for reciprocating said members.

4. In a stone working machine, a truck, a standard thereon bodily movable longitudinally thereof, tool actuating mechanism including a plurality of reciprocable members on said standard, a motor on said truck disposed outside the range of movement of said standard, and a constantly operative driving connection between said tool actuating mechanism and said motor.

5. In a stone working machine, a truck, a standard thereon adjustable relative thereto, cutting appliances on said standard, a motor on said truck, and means including a longitudinally extensible driving shaft connected between said motor and cutting appliances for operating the latter, said extensible shaft being adjustable in length according to the relative positions of the truck and standard.

6. In a stone working machine, a truck, a standard thereon adjustable relative thereto, cutting appliances on said standard, a motor on said truck, and means for operating said cutting appliances from said motor including a longitudinally extensible shaft having a swivel connection to one of said elements.

7. In a stone working machine, a truck, a standard thereon adjustable relative thereto, cutting appliances on said standard, a motor on said truck, and means for operating said cutting appliances from said motor including a longitudinally extensible shaft having a universal connection at each of its ends.

8. In a stone working machine, a truck, a standard thereon, tool actuating mechanism on said standard, means for adjusting said actuating mechanism relative to said standard, a motor on said truck, and flexible connections between said motor and said tool actuating mechanism and said adjusting means.

9. In a stone working machine, a truck, a standard adjustable on said truck, a frame adjustable on said standard, tool actuating mechanism on said frame, a motor on said truck, and extensible driving connections between said motor and said frame and said tool actuating mechanism.

10. In a stone working machine, a truck, truck wheels therefor, a standard on said truck, tool actuating mechanism on said standard, a motor on said truck, and means operatively connected to said motor for simultaneously actuating both said tool actuating mechanism and said truck wheels from said motor.

11. In a stone working machine, a truck, a motor thereon, a standard on said truck, a frame adjustable on said standard, tool-actuating mechanism carried on said frame, a motor carried on said truck, and simultaneously operative connections between said motor and said frame, said tool-actuating mechanism and said truck.

12. In a stone working machine, a truck, a standard adjustable thereon, a frame on said standard, a rotatable shaft on said frame, a crank connected to said shaft, cylinder and piston mechanism mounted on said frame and operatively connected to said crank, a motor mounted on said truck, and a flexible driving connection between said motor and said shaft.

13. In a stone working machine, a truck, a standard adjustable thereon, a frame adjustable on said standard, a rotatable shaft on said frame, a crank connected to said shaft, cylinder and piston mechanism mounted on said frame and operatively connected to said crank, a motor mounted on said truck, and flexible driving connections between said motor and said shaft and said motor and said adjustable frame.

14. In a stone working machine, a truck, a standard thereon, a frame carried on said standard, a rotatable shaft on said frame, a crank connected to said shaft, a cylinder reciprocatively mounted on said frame and connected to said crank, a tool-operating piston movable in said cylinder, a motor mounted on said truck, and a driving connection between said motor and said shaft.

15. In a stone working machine, a truck, a standard thereon, a frame carried on said standard, a rotatable shaft on said frame, a crank connected to said shaft, a cylinder reciprocatively mounted on said frame and connected to said crank, a tool-operating piston movable in said cylinder, a motor mounted on said truck, and an extensible driving shaft connected between said motor and said shaft.

16. In a stone working machine, a truck, a standard thereon, a frame carried on said standard, a rotatable shaft on said frame, a crank connected to said shaft, a cylinder reciprocatively mounted on said frame and connected to said crank, a tool-operating piston movable in said cylinder, a motor mounted on said truck, and a flexible extensible driving shaft connected between said motor and said shaft.

17. In a stone working machine, a truck, a standard thereon, a frame adjustable on said standard, a rotatable shaft on said frame, a crank connected to said shaft, a cylinder reciprocatively mounted on said frame and connected to said crank, a tool-operating piston movable in said cylinder, a motor mounted on said truck, a flexible extensible driving shaft connected between said motor and said shaft, and means connected to said motor for adjusting said frame on said standard.

18. In a stone working machine, a truck, wheels therefor, a standard on said truck, a frame adjustable on said standard, tool actuating mechanism carried on said frame, a plurality of shafts on said truck, one connected to said truck wheels and the other to said adjustable frame, a single motor on said truck operatively connected to said shafts, and a simultaneously operative driving connection between said motor and said tool actuating mechanism, and said motor and truck.

19. In a stone working machine, a truck, wheels therefor, a standard adjustably mounted on said truck, a frame adjustable on said standard, means for adjusting the same, tool actuating mechanism carried on said frame, a single motor carried on said truck, driving connections between said motor and said truck wheels, a flexible driving connection between said motor and said frame, adjusting means and a flexible driving connection, operative simultaneously with said wheel driving connections between said motor and said tool actuating mechanism.

20. In a stone working machine, a truck, wheels therefor, a standard on said truck, a frame adjustable on said standard, means for adjusting the same, tool-actuating mechanism carried on said frame, a plurality of shafts on said truck, operative connections between said shafts and said frame adjusting means and truck wheels, a motor disposed above one of said shafts and having a vertically disposed armature shaft, operative connections between one end of said armature shaft and the shaft beneath the same, and a driving connection between the opposite end of said armature shaft and said tool-actuating mechanism.

21. In a stone working machine, a truck, a standard thereon, a frame adjustable on said standard, a rotatable shaft on said frame, a crank connected to one end of said shaft, a cylinder reciprocatively mounted on said frame and connected to said crank, a tool-operating piston movable in said cylinder, a gear carried on the other end of said rotatable shaft, a coöperating gear journaled on said frame, a motor carried on said truck, and an extensible driving shaft connected between said motor and said coöperating gear.

22. In a stone working machine, a truck, a standard angularly adjustable thereon, a frame adjustable on said standard, a tool reciprocatively mounted on said frame, a rotatable shaft on said frame, a crank connected to one end of said shaft, a cylinder reciprocatively mounted on said frame and connected to said crank, a piston movable in said cylinder and carrying a hammer engageable with said tool, a motor on said truck, and driving connections including an extensible shaft disposed between the other end of said rotatable shaft and the motor on said truck.

23. In a stone working machine, a truck, a trunnion bar thereon, a standard supported by said trunnion bar and angularly and longitudinally adjustable thereon, cutting appliances including a plurality of reciprocable members on said standard, a motor on said truck, and a constantly operative driving connection between said motor and cutting appliances for operating the latter.

24. In a stone working machine, a truck, an adjustable standard thereon, cutting appliances on said standard, a motor on said truck, and driving connections, including flexible shafting, between said motor and cutting appliances for operating the latter.

25. In a stone working machine, a truck, an adjustable standard thereon, cutting appliances on said standard, a motor on said truck, and driving connections, including flexible shafting and chain and sprocket gearing, between said motor and cutting appliances for operating and controlling the latter.

26. In a stone working machine, a truck, an adjustable standard thereon, cutting appliances on said standard, a motor on said truck, and driving connections, including telescopic shafting and chain and sprocket gearing, between said motor and cutting appliances for operating and controlling the latter.

27. In a stone working machine, a truck, an adjustable standard thereon, cutting appliances on said standard, a motor on said truck, and driving connections, including flexible telescopic shafting and chain and sprocket gearing, between said motor and cutting appliances for operating and controlling the latter.

28. In a stone working machine, a standard, cutting appliances adjustably mounted on said standard, a motor, and driving connections from said motor for actuating said cutting appliances and for adjusting the position of said appliances on said standard.

In testimony whereof we affix our signatures.

THOMAS OFFICER.
HENRY H. MERCER.

Copies of this patent may be obtained for five cents each, by addressing the "Commissioner of Patents, Washington, D. C."